United States Patent [19]

Hohman et al.

[11] 4,330,313

[45] May 18, 1982

[54] PREHEAT HOPPER AGITATORS

[75] Inventors: Charles M. Hohman, Granville; Mark A. Propster, Gahanna; Stephen Seng, Frazeysburg, all of Ohio

[73] Assignee: Owens-Corning Fiberglas Corporation, Toledo, Ohio

[21] Appl. No.: 209,787

[22] Filed: Nov. 24, 1980

[51] Int. Cl.³ .................. C03B 37/025; C03B 3/00
[52] U.S. Cl. ............................................. 65/2; 65/27; 65/134; 65/335
[58] Field of Search ............... 65/27, 134, 335, 2; 210/221.2

[56] References Cited

U.S. PATENT DOCUMENTS

| | | | |
|---|---|---|---|
| 3,725,022 | 4/1973 | Mills | 65/27 |
| 3,788,478 | 1/1974 | Savage | 210/221.2 X |
| 3,828,935 | 8/1974 | Rovel | 210/221.2 X |
| 3,831,758 | 8/1974 | Watson et al. | 210/221.2 X |
| 4,238,216 | 12/1980 | Nevard | 65/27 X |
| 4,248,616 | 2/1981 | Seng et al. | 65/27 X |
| 4,277,277 | 7/1981 | Prosper | 65/335 X |
| 4,282,018 | 8/1981 | Froberg | 65/27 |

FOREIGN PATENT DOCUMENTS

| | | | |
|---|---|---|---|
| 486447 | 11/1929 | Fed. Rep. of Germany | 65/335 |
| 2853174 | 6/1979 | Fed. Rep. of Germany | 65/27 |

*Primary Examiner*—Robert L. Lindsay, Jr.
*Attorney, Agent, or Firm*—Ronald C. Hudgens; Philip R. Cloutier

[57] ABSTRACT

A pellet preheat hopper is disclosed, the hopper being equipped with agitator means proximately coincident with the upper operating pellet level to break up pellet encrustation.

8 Claims, 4 Drawing Figures

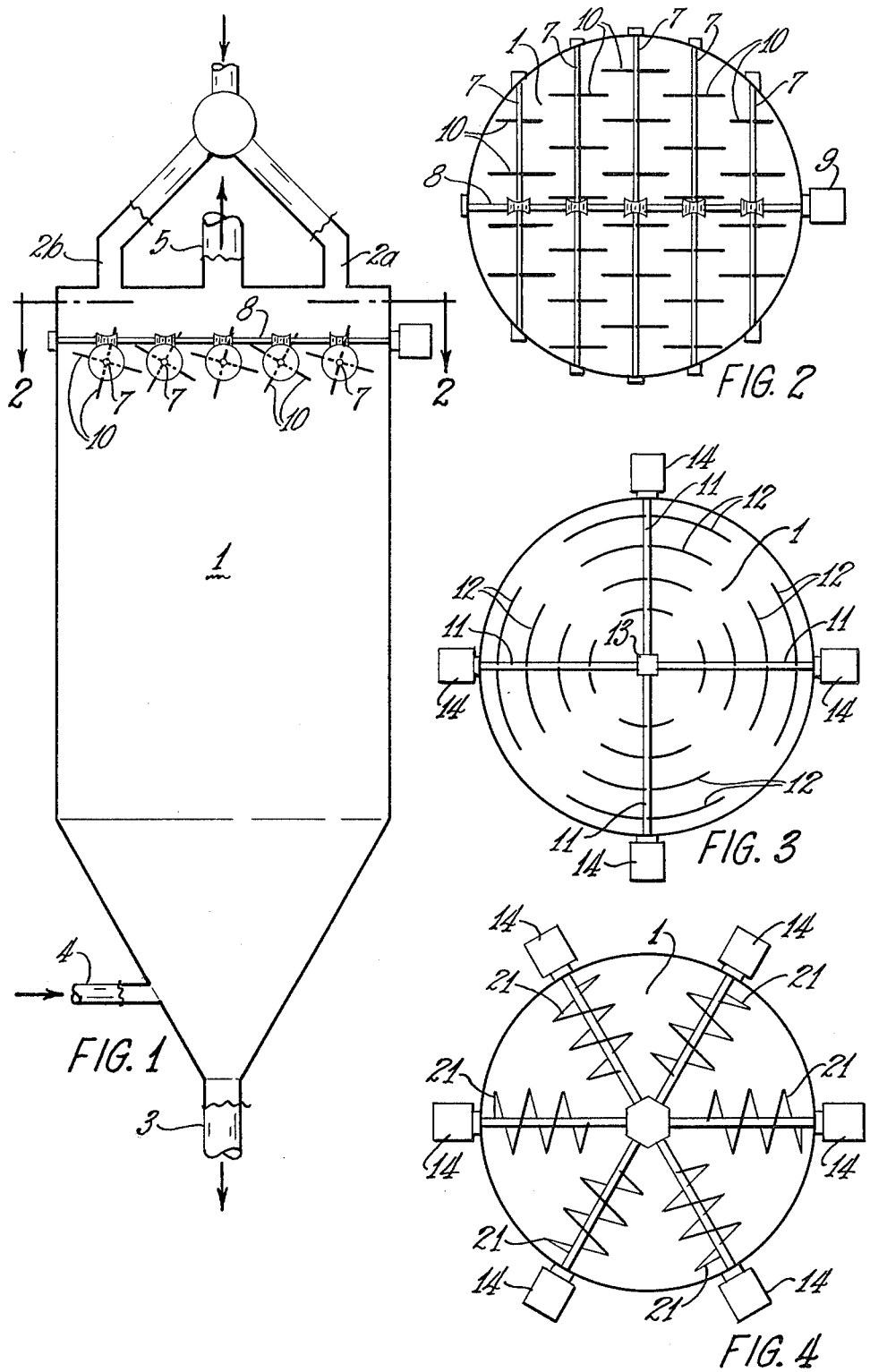

PREHEAT HOPPER AGITATORS

This invention pertains to preheat hopper agitators.

In one of its more specific aspects, this invention pertains to modification of preheat hoppers.

It is the practice in glass fiber production to pelletize the particulate batch, dry and preheat the pellets, introduce the preheated pellets into the furnace wherein they are melted to form molten glass and to pull glass fibers from the molten glass.

Considerable difficulties have been encountered in this operation. One of these involves that related to the drying and preheating of the pellets. Usually, this phase of the process is carried out by passing the wet pellets downwardly and counter-currently to hot gases entering a pellet drier at or near the bottom. Several problems have been associated with this procedure and various modifications have been made to eliminate such problems.

One such modification has been the introduction of preheat hoppers into which the pellets are routed from the pelletizing step. These preheat hoppers allow the introduction thereinto of lower temperature gases in a first drying step, after which the pellets are introduced into contact with a second hot gas stream which is at a higher temperature. Operation in this manner tends to decrease the tendency of the pellets to explode by elimination of water vaporization which frequently occurs upon contact with too high temperature gases.

However, certain problems can still occur within the system. One principal problem is that the pellets in the upper portion, and usually in the very top layer of the standing bed of the preheat hopper, tend to agglomerate. Agglomeration in this manner tends to seal off the top of the bed to the point that hot gas passage upwardly out of the bed is appreciably reduced, if not reduced entirely. This invention is directed to the solution of that problem.

According to this invention, there is provided a pellet preheat hopper comprising a chamber having an upper pellet inlet and a lower pellet outlet, a lower gas inlet and an upper gas outlet, and agitator means positioned in the upper portion of said chamber at the upper operating level of the chamber.

In the preferred embodiment of the invention, the agitator is positioned across a principal portion of the area of the chamber at, or slightly beneath, that upper level at which pellets are maintained in the chamber such that upon activation, the agitator means acts to break up agglomerates of pellets which form at and near the upper surface of the pellet bed level.

Also, in the preferred embodiment, the agitator means is activated on a time sequence basis.

The apparatus of this invention will be more easily understood if explained in conjunction with the attached drawings in which:

FIG. 1 is an elevational cross-section view of the apparatus of this invention; and, FIGS. 2, 3 and 4 are plan views of various embodiments of the invention taken through 2—2 of FIG. 1.

Referring now to FIG. 1, there is shown a pellet preheat hopper comprised of chamber 1 having one or more pellet inlets 2a and 2b opening into the upper portion of the chamber and pellet outlet 3 opening from the lower portion of the chamber. Relatedly, chamber 1 has one or more gas inlets 4 opening into the bottom of the chamber and one or more gas outlets 5 opening from the upper portion of the chamber for the exit of gas therefrom. Positioned such that they intersect, and thus disturb, the upper pellet level is one or more rotatably mounted spider agitators 7.

Any suitable arrangement of agitators can be employed. It is only necessary that they they be placed proximate the surface of the pellet bed and, by any type of agitation, inhibit the formation of a pellet crust thereon.

For example, as shown in FIG. 2, a series of agitators 6 can be comprised of a series of spider arms 7 rotatably supported at their inward ends by common shaft 8 extending across the bed, the spiders being rotatably driven by rotating means 9, the arms being of unlike lengths such that, in combination, their rotation breaks up the upper surface of the bed or prevents its encrustation. As may be necessary, the arms can be on any suitable spacing and will preferably have their appendage arms 10 alternately positioned to break up adjacent sections of the bed.

In another embodiment, as shown in FIG. 3, the chamber can be adapted with a plurality of rotatable spiders 11, each equipped with appendages 12 and terminating in an upwardly extending support 13, each arm being driven by independent drive means 14.

Another type of agitator means which can be employed is a screw, or auger, type as shown in FIG. 4. As depicted, one, or several, augers 21 are positioned in spaced arrangement at the surface of the pellet bed and are caused to revolve, continuously or intermittently, by drive means 14. In so doing, the rotating action of the screws keeps the surface from encrusting and, thus, prevents the building up of a solid surface layer and facilitates the upward passage of the drying gases out of the pellet bed.

It will be evident from the foregoing that various modifications can be made to this invention. Such, however, are considered within the scope of the invention.

We claim:

1. Apparatus for preheating glass batch pellets comprising:
   (a) a chamber having an upper operating pellet level;
   (b) a lower gas inlet opening into and an upper gas outlet opening from said chamber;
   (c) an upper pellet inlet and a lower pellet outlet from said chamber; and,
   (d) agitator means positioned within the upper portion of said chamber proximately coincident with said upper operating pellet level and comprising a plurality of rotatable members extending across a principal portion of the area of said chamber, said agitator being rotatable by drive means on a time sequence basis.

2. The apparatus of claim 1 in which said agitator means comprises a spider agitator.

3. The apparatus of claim 1 in which said agitator means comprises an auger.

4. The apparatus of claim 1 in which said agitator comprises a plurality of spiders supported at their inward ends by a shaft extending across said chamber.

5. The apparatus of claim 1 in which said agitator comprises a plurality of spiders supported at their inner ends by an upwardly extending support.

6. The apparatuus of claim 1 in which said agitator means are driven by intermittently rotating drive means.

7. The apparatus of claim 1 in which said agitator means comprises continuously rotating drive means.

8. In a process for producing glass fibers in which batch pellets are preheated in a chamber at a predetermined level of the pellet bed by hot gases passing through the bed, melted in a furance to form molten glass and the molten glass is drawn to form fibers, the improvement comprising agitating said pellets at said predetermined bed level to break up pellet agglomeration at said bed level and to increase the upward passage of hot gases out of said bed.

* * * * *